US011651577B2

United States Patent
Bernardon et al.

(10) Patent No.: US 11,651,577 B2
(45) Date of Patent: May 16, 2023

(54) AUGMENTED REALITY-BASED PLY LAYUPS ON A COMPOSITE PART LAYUP TOOL

(71) Applicant: Siemens Industry Software Inc., Plano, TX (US)

(72) Inventors: Edward Bernardon, Bedford, MA (US); Robert S. Flory, Concord, MA (US)

(73) Assignee: Siemens Industry Software Inc., Plano, TX (US)

( * ) Notice: Subject to any disclaimer, the term of this patent is extended or adjusted under 35 U.S.C. 154(b) by 379 days.

(21) Appl. No.: 16/482,412

(22) PCT Filed: Sep. 4, 2018

(86) PCT No.: PCT/US2018/049327
§ 371 (c)(1),
(2) Date: Jul. 31, 2019

(87) PCT Pub. No.: WO2019/067168
PCT Pub. Date: Apr. 4, 2019

(65) Prior Publication Data
US 2020/0250893 A1 Aug. 6, 2020

Related U.S. Application Data

(60) Provisional application No. 62/563,116, filed on Sep. 26, 2017.

(51) Int. Cl.
*G06T 15/00* (2011.01)
*G06T 19/20* (2011.01)
(Continued)

(52) U.S. Cl.
CPC .......... *G06T 19/20* (2013.01); *G02B 27/0172* (2013.01); *G02B 27/0179* (2013.01);
(Continued)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS

2002/0133264 A1* 9/2002 Maiteh ............... G05B 19/4097
700/182
2018/0339469 A1* 11/2018 Stone ..................... B29C 70/50

FOREIGN PATENT DOCUMENTS

MC  WO 2017/009128 A1 * 1/2017 ............ G06Q 10/06
WO  2017009128 A1   1/2017

OTHER PUBLICATIONS

T.P. Caudell et al, "Augmented Reality: An Application of Heads-Up Display Technology to Manual Manufacturing Processes", System Sciences, 1992, Proceedings of the Twenty-Fifth Hawaii International Conference on Kauai, HI, USA, 7-10 Jan. 1, Los Alamitos, CA, USA, IEEE Comput. Soc, US, pp. 659-669.

(Continued)

*Primary Examiner* — Gordon G Liu (57) ABSTRACT

A system may support augmented reality (AR)-based layup of plies to form a composite laminate. The system may include an AR headset configured to drive an AR view that digitally visualizes ply placement data on a composite part layup tool physically visible through the AR headset. The system may also include an AR ply layup engine AR ply layup engine configured to analyze a view of the AR headset to identify the composite part layup tool, obtain ply placement data, and provide ply placement data to the AR headset to digitally overlay on the composite part layup tool physically visible through the AR headset.

18 Claims, 6 Drawing Sheets

(51) Int. Cl.
  *G06T 7/73* (2017.01)
  *G06F 30/00* (2020.01)
  *G02B 27/01* (2006.01)
  *G06T 19/00* (2011.01)
(52) U.S. Cl.
  CPC .............. *G06F 30/00* (2020.01); *G06T 7/74* (2017.01); *G06T 19/006* (2013.01); *G02B 2027/0187* (2013.01); *G06T 2207/30164* (2013.01)
(58) Field of Classification Search
  USPC ........................................................ 345/419
  See application file for complete search history.

(56) References Cited

OTHER PUBLICATIONS

Roisin McConnell et al, "An Interactive and Immersive Human-Computer Interface for Rapid Composite Part Production Design", Institution of Mechanical Engineers, Proceedings, Journal of Engineering Manufacture, vol. 232, No. 13, May 14, 2017, pp. 1-16, XP055529491.

Sara Black, "Laser Projection: Envisioning more than templates", Compositesworld, vol. 1, No. 5, May 2015, pp. 48-57, XP055529277.

Christopher Freeman et al, "Location, Location, Location. An Exercise in Cost and Waste Reduction Using Augmented Reality in Composite Layup Manufacturing", 2015 IEEE Virtual Reality (VR), IEEE, Mar. 23, 2015, pp. 387-388, XP033209067 [retrieved on Aug. 25, 2015].

PCT International Search Report and Written Opinion of International Searching Authority dated Dec. 13, 2018 corresponding to PCT International Application No. PCT/US2018/049327 filed Sep. 4, 2018.

Matthew Such et al.: "Intelligent Composite Layup by the Application of Low Cost Tracking and Projection Technologies", Procedia Cirp, vol. 25, Dec. 10, 2014, pp. 122-131, 10 pages.

EP Communication pursuant to Article 94(3) EPC dated May 25, 2021, for EP Application No. 18783165.6, 11 pages.

* cited by examiner

AUGMENTED REALITY-BASED PLY LAYUPS ON A COMPOSITE PART LAYUP TOOL

CROSS REFERENCE TO RELATED APPLICATION

This application claims the benefit of priority to U.S. Provisional Application No. 62/563,116, filed on Sep. 26, 2017 and titled "SYSTEM AND METHOD FOR COMPOSITE LAYUP UTILIZING AUGMENTED REALITY", which is incorporated herein by reference in its entirety.

BACKGROUND

Composite part layup tools may be used to perform ply layups for construction of a composite part. Systems exist to guide a layup operator in laying up plies of composite materials on layup tooling to construct the composite part.

SUMMARY

Disclosed implementations include systems, methods, devices, and logic that support ply layups on a composite part layup tool using augmented reality (AR). Augmented reality may refer to any technology or mechanism to superimpose (e.g., overlay) computer-generated images on a view of a physical elements, and various features for AR-based ply layups are described herein.

In one example, a system may include an AR headset and an AR ply layup engine. The AR headset may be configured to drive an AR view that digitally visualizes ply placement data on a composite part layup tool physically visible through the AR headset. The AR ply layup engine may be configured to analyze a view of the AR headset to identify the composite part layup tool, match a computer-aided design (CAD) generated ply placement position of a given ply to layup via the composite part layup tool, and provide the CAD generated ply placement position of the given ply to the AR headset as the ply placement data to digitally overlay on the composite part layup tool physically visible through the AR headset.

In another example, a method may be performed, executed, or otherwise carried out by a computing system. The method may include analyzing a view of an AR headset to identify a composite part layup tool visible through an AR headset, matching a CAD generated ply placement position of a given ply to layup via the composite part layup tool, and providing the CAD generated ply placement position of the given ply to the AR headset as ply placement data to digitally overlay on the composite part layup tool visible through the AR headset.

In yet another example, a non-transitory machine-readable medium may store instructions executable by a processor. Upon execution, the instructions may cause the processor or a system to analyze a view of an AR headset to identify a composite part layup tool visible through an AR headset, match a CAD generated ply placement position of a given ply to layup via the composite part layup tool, determine an incremental placement path for the given ply, and provide the CAD generated ply placement position and the incremental placement path for the given ply to the AR headset as ply placement data to digitally overlay on the composite part layup tool visible through the AR headset.

BRIEF DESCRIPTION OF THE DRAWINGS

Certain examples are described in the following detailed description and in reference to the drawings.

DETAILED DESCRIPTION

The discussion below refers to plies and composite part layup tools, which may be used to construct, manufacture, or otherwise form a composite part. Composite parts (also referred to herein as composite laminates) may refer to any object or structure that is composed of multiple layers of material (e.g., plies). Composite parts may be formed by sequentially layering ply by ply to construct the composite part or composite laminate, many times through use of a composite part layup tool. Construction of composite parts is used in many industries, for instance in aerospace, automotive, transport, textile, and various other industries. Physical layup of a ply (e.g., via placement, lamination, or attachment) may be performed on the surface of a composite part layup tool. Composite part layup tools may provide a specifically-shaped physical surface upon which layers of plies are successively placed to form the composite laminate. Composite laminates continue to increase in complexity, sometimes requiring tens, hundreds, or thousands of ply layups to construct the end product. Ply layups may thus require a high degree of precision, are many times unique to a specific product, and often require time-intensive manual labor.

Various tools exist to guide an operator in manually placing plies across a composite part layup tool to form a composite laminate. Some guiding systems may utilize lasers to trace an outline of plies for layup on a composite part layup tool, but these laser systems can be expensive, rigid, and difficult to program. Static cameras may be used to view a composite part layup tool and added plies, but such systems are also inflexible and difficult to maneuver, often times limiting the degree to which an operator can fully view the composite part layup tool and properly layup successive plies at different positions over a composite part layup tool.

The disclosure herein may provide systems, methods, devices, and logic for AR-based ply layups. As described in greater detail herein, AR-based ply layups may provide mechanisms for flexible and accurate CAD generated ply placement data that is overlaid, via AR technologies, over a composite part layup tool. Various forms of ply placement data may be generated and visualized via AR devices, which may provide digital enhancements that are overlaid on a view of the composite part layup tool itself and any ply layers already applied for construction of a composite laminate. Examples of ply placement data contemplated herein include ply outlines, incremental placement paths, draping simulation results, potential distortion and defects, layup instructions or real-time feedback, each of which may be digitally overlaid to assist a user in ply layups. Moreover, the AR-based ply layup features described herein may consistently supply such AR-based visual enhancements while maintaining a user's freedom to physically move and layup plies via the composite part layup tool, which may be not be possible with other position-fixed ply layup tools.

Figure 1:
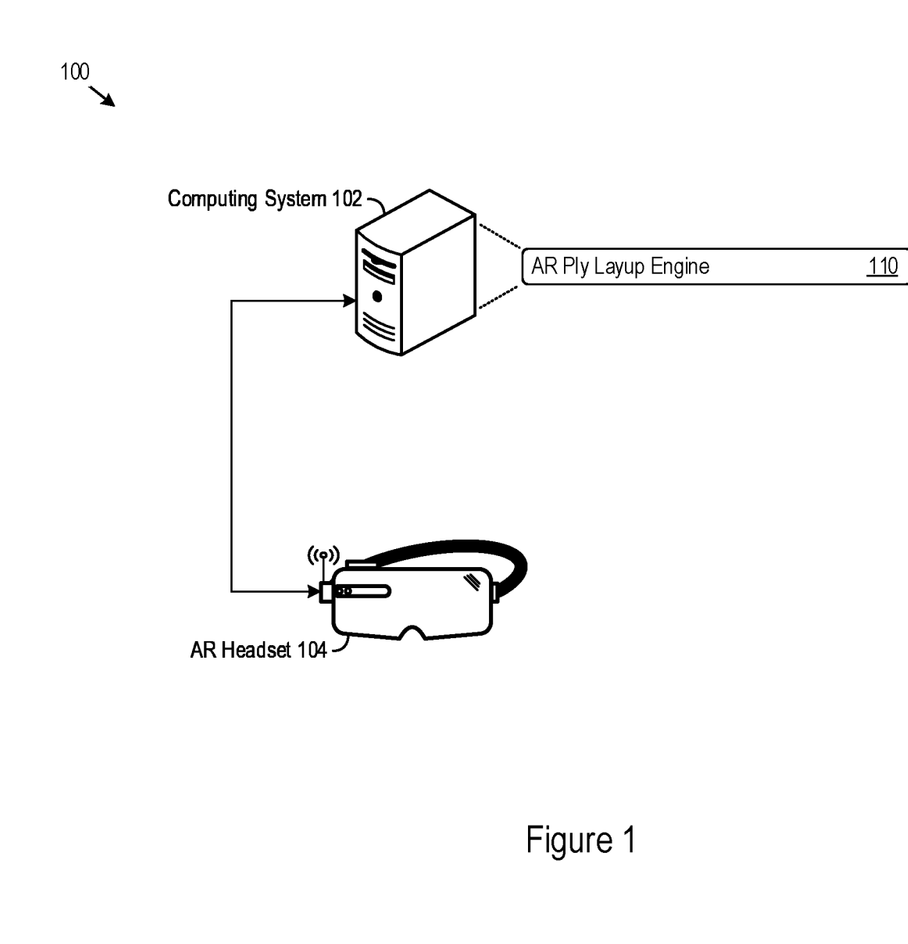
FIG. 1 shows an example of a system that supports AR-based ply layups on a composite part layup tool.

FIG. 1 shows an example of a system 100 that supports AR-based ply layup on a composite part layup tool. The system 100 shown in FIG. 1 includes a computing system 102 and an AR headset 104. The computing system 102 may include a single or multiple computing devices such as application servers, compute nodes, desktop or laptop computers, smart phones or other mobile devices, tablet devices, embedded controllers, and more. The AR headset 104 may take the form of any wearable device that provides AR capabilities to digitally overlay computer-generated images upon a user's view of physical elements. As such, the AR headset 104 may be implemented as AR glasses or other viable AR headwear As described in greater detail herein, the computing system 102 may access, generate, or provide ply placement data for visualization through the AR headset 104. The ply placement data may provide various digital enhancements to a physical view to assist, guide, or inform a user in ply layups using a composite part layup tool. As such, the computing system 102 may provide CAD generated ply placement positions, incremental placement paths, simulated layups, ply interest zones, real-time feedback (after physical layup occurs), and other forms of ply placement data to the AR headset 104 for visualization. The AR headset 104 may overlay the ply placement data upon a physical view of a composite part layup tool or already-applied ply layers, even as a user changes physical positions during construction of a composite laminate.

As an example implementation, the computing system 102 shown in FIG. 1 includes an AR ply layup engine 110. The computing system 100 may implement the AR ply layup engine 110 (and components thereof) in various ways, for example as hardware and programming. The programming for the AR ply layup engine 110 may take the form of processor-executable instructions stored on a non-transitory machine-readable storage medium and the hardware for the AR ply layup engine 110 may include a processor to execute those instructions. A processor may take the form of single processor or multi-processor systems.

In operation, the AR headset 104 may drive an AR view that digitally visualizes ply placement data on a composite part layup tool physically visible through the AR headset 104. In operation, the AR ply layup engine 110 may analyze a view of the AR headset 104 to identify the composite part layup tool, match a CAD generated ply placement position of a given ply to layup via the composite part layup tool, and provide the CAD generated ply placement position of the given ply to the AR headset as the ply placement data to digitally overlay on the composite part layup tool physically visible through the AR headset 104.

These and other example features of AR-based ply layups according to the present disclosure are described in greater detail next.

Figure 2:
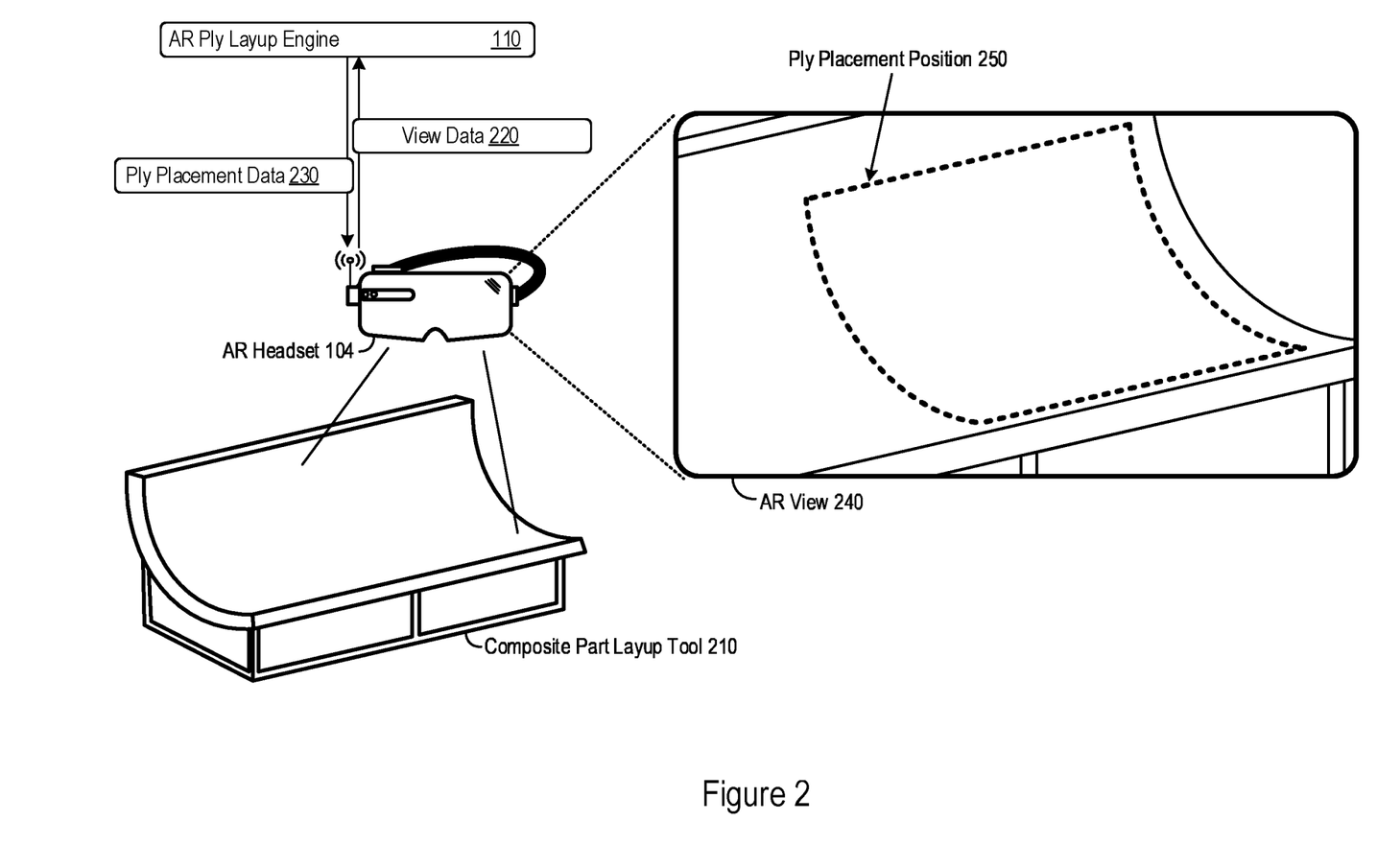
FIG. 2 shows an example of ply placement data that an AR ply layup engine may provide to an AR headset to digitally overlay on a view of a composite part layup tool.

FIG. 2 shows an example of ply placement data that an AR ply layup engine may provide to an AR headset to digitally overlay on a view of a composite part layup tool. In particular, FIG. 2 illustrates a composite part layup tool 210 visible via the AR headset 104 (the user/operator is not shown). The AR headset 104 may be communicatively linked to the AR ply layup engine 110, e.g., via one or more networks any type or protocol (e.g., wireless technologies such as Bluetooth, 3G, 4G, 5G, 802.11, etc.). Although illustrated separately in FIG. 2, in some examples the AR headset 104 itself may implement some (or all) of the various features of the AR ply layup engine 110 as described herein.

To support AR-based ply layups, the AR headset 104 may transmit a current view of physical elements visible through the AR headset 104. In FIG. 2, the AR headset 104 provides view data 220 to the AR ply layup engine 110, which may include any image or video data that represents a view visible through the AR headset 104. For instance, the AR headset 104 may include a digital image capture device (e.g., a digital camera) by which the view data 220 is obtained and then transmitted to the AR ply layup engine 110. The view data 220 may include digital video data, static images, or combinations thereof.

The AR ply layup engine 110 may analyze the view data 220 to identify the composite part layup tool 210 or already-placed plies. To do so, the AR ply layup engine 110 may parse through the view data 220 to identify any discernable characteristics, properties, elements, points, or other identifying data for the composite part layup tool 210 or previously placed plies during construction of a composite laminate. Identifying characteristics for the composite part layup tool 210 may include any physical identification points physically embedded, include, or constructed on the composite part layup tool 210 itself (e.g., specifically to support AR-based ply layups and detection in an AR view).

In a consistent manner, the AR ply layup engine 110 may identify characteristics of already-placed plies, e.g., via comparison to CAD simulations to compare fiber characteristics or orientations, composite material (e.g., ply) characteristics, and the like. For a composite laminate that is partially constructed (e.g., with one or more ply layups already completed on the composite part layup tool 210), the AR ply layup engine 110 may analyze the view data 220 to determine a present state of a ply layup process. For instance, the AR ply layup engine 110 may identify specific textures or ply materials present in the view data 220, along with relevant positions and layering of such plies, in order to determine which plies have been placed using the composite part layup tool 210. Such data may be relevant to determine a subsequent ply to layup via the compositely layup tool 210 to form a composite laminate. Additionally or alternatively, the AR ply layup engine 110 may track a present state of the ply layup process as successive plies are placed and laminated, e.g., as tracked via the view data 220 or other user indication.

By analyzing the view data 220, the AR ply layup engine 110 may also determine an orientation of the AR headset 104 (and accordingly a user) as positioned with respect to the composite part layup tool 210 and already-placed plies. Doing so may allow the AR ply layup engine 110 to more precisely, accurately, or efficiently provide ply placement data to augment the physical view of the composite part layup tool 210.

The AR-based ply layup features described herein may provide a user with the flexibility to physically move during a ply layup process. As the AR headset 104 may be physically worn, a user may be free to move around the composite part layup tool 210 to, for example, find a better layup angle to place a given ply or to find a better position to layup the given ply along various boundaries. As the user moves, the AR ply layup engine 110 may continually analyze the view data 220 to properly identify positioning of ply placement data provided to the AR headset 104 to digitally overlay.

Turning to the ply placement data itself, the AR ply layup engine 110 may provide various forms of ply placement data to the AR headset 104 to support AR-based ply layups. In FIG. 2, the AR ply layup engine 110 transmits the ply placement data 230 to the AR headset 104, by which the AR headset 104 may augment the physical view visible through the AR headset 104. The AR ply layup engine 110 may obtain and provide ply placement data 230 on a per-ply basis. Since ply layups occur sequentially during composite laminate construction, the AR ply layup engine 110 may generate and provide ply placement data 230 for a current ply to be, is being, or has been laid up via the composite part layup tool 210. In some implementations, the ply placement data 230 is CAD generated, for example via a fiber simulation CAD tool or other CAD tool with CAD design, simulation, and testing capabilities for composite laminates constructed through a series of ply layups.

As a particular example, the AR ply layup engine 110 may obtain and provide ply placement positions for plies placed via the composite part layup tool 210. Such ply placement positions may provide an indication of the specific locations at which plies are to be laid up on the composite part layup tool 210, visible as digital overlays on the actual surface of the composite part layup tool 210 through the AR headset 104. In that regard, the ply placement data 230 provided by the AR ply layup engine 110 may specify the specific positions (e.g., locations in the view of the AR headset 104) at which to digitally augment with the ply placement data 230.

To provide an illustration of visualization of the ply placement data 230, FIG. 2 depicts an example composite interface (e.g., composite view) visible through the AR headset 104 as the AR view 240. The AR headset 104 may drive the AR view 240 by augmenting the physical view of the composite part layup tool 210 with the ply placement data 230 received from the AR ply layup engine 110. In the AR view 240 depicted in FIG. 2, the AR headset 104 overlays a ply placement position 250 over the physical view of the composite part layup tool 210. The ply placement position 250 may provide any type of positioning data applicable to a given ply for construction of a composite laminate using the composite part layup tool 210.

In FIG. 2, the ply placement position 250 is shown as a dotted outline digitally overlaid on the view of the AR headset 104, and specifically positioned over the relevant portions of the surface of the composite part layup tool 210 (or, in other cases, previously laid plies) in which a given ply is to be placed. As a user moves, the AR ply layup engine 110 may continually update the positioning for the ply placement position 250 within the view of the AR headset 104 such that the ply placement position 250 is accurately overlaid across the physical surface of the composite part layup tool 210. Thus, the AR headset 104 (via the AR ply layup engine 110) may visualize 3D ply outlines on a surface of the composite part layup tool 210, assisting a user in the actual manual layup of a given ply even as the user moves and the field of vision through the AR headset 104 changes.

Figure 3:
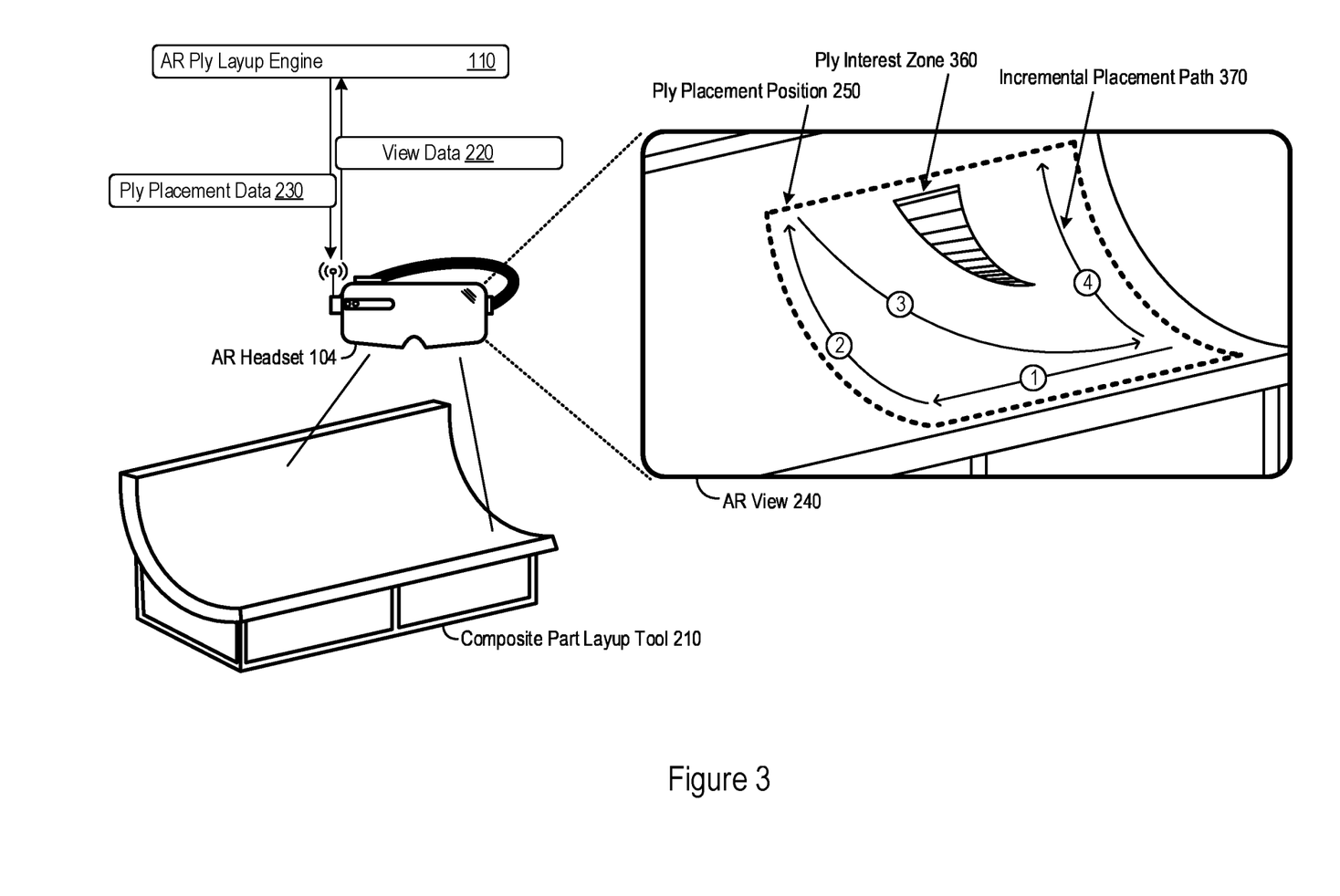
FIG. 3 shows further examples of ply placement data that the AR ply layup engine may provide to the AR headset to digitally overlay on a view of a composite part layup tool.

While FIG. 2 provides an example of ply placement data 230 in the form of ply placement position 250, the AR ply layup engine 110 and AR headset 104 may support various other forms of ply placement data 230 as well, some of which are presented next in FIG. 3.

FIG. 3 shows further examples of ply placement data that the AR ply layup engine 110 may provide to the AR headset 104 to digitally overlay on a view of a composite part layup tool 210. In FIG. 3, the AR headset 104 drives an AR view 240 to digitally augment the ply placement data 230 provided by the AR ply layup engine 110. The ply placement data 230 shown in FIG. 3 includes the ply placement position 250 (e.g., as described for FIG. 2), a ply interest zone 360, and an incremental placement path 370 for a given ply. These forms of ply placement data 230 are depicted in the AR view 240 shown in FIG. 3.

For the ply interest zone 360, the AR ply layup engine 110 may identify selected portions of a given ply that exhibit different layup characteristics than other portions of the given ply. For instance, a ply portion may require a specific 3D shape, pressure requirement, texture, or other layup application characteristic that impacts the effectiveness in performing a layup for the given ply. Such characteristics may result in wrinkling during layup or cause other unwanted results, e.g., may be identified or predicted via CAD simulation. The AR ply layup engine 110 may identify relevant interest zones for a given ply from such CAD simulation data (e.g., access from a CAD tool used to model and simulate construction of a composite laminate including a given ply), which the AR ply layup engine 110 may include in the ply placement data 230 as ply interest zones. Thus, example ply interest zones include portions susceptible to wrinkling or distortion during layup.

The ply interest zone 360 depicted in the AR view 240 of FIG. 3 shows one example of how the AR ply layup engine 110 may identify a ply region and how the AR headset 104 may augment a view to highlight an identified ply region. The ply interest zone 360 may indicate a (relative) high probability or wrinkling or indicate to a user that the highlighted ply portion may require increased lamination pressure, and the like. Such zones may be color-coded based on a degree of susceptibility to undesired effects, e.g., using a green, yellow, and red color scale indicative of wrinkling degree.

As another example, the AR ply layup engine 110 may include an incremental placement path for a given ply as part of the ply placement data 230. The incremental data path may specify a sequence to layup a particular ply, which may guide a user in ply layups with increased efficiency or effectiveness. In some examples, the AR ply layup engine 110 obtains an incremental placement path from a CAD tool that has analyzed the particular ply, composite part layup tool 210, or other factors to determine a sequence of ply application.

In FIG. 3, the AR ply layup engine 110 provides an incremental placement path 370 for a given ply as part of the ply placement data 230. As seen in FIG. 3, the AR headset 104 projects the incremental placement path 370 over the surface of the composite part layup tool 210 (or possibly the given ply itself during actual layup of the given ply by a user). The example incremental placement path 370 shown in FIG. 3 is in the form of numbered arrows which may signal a sequence for a user to layup various portions of a given ply. Any other visual sequence indicators can be generated by the AR ply layup engine 110 and overlaid by the AR headset 104.

In some implementations, the AR ply layup engine 110 dynamically updates the incremental placement path 370 as actual layup of a given ply occurs. In that regard, the AR headset 104 may continuously transmit view data 220 of the given ply during physical layup, which the AR ply layup engine 110 may analyze to determine a current state of the physical layup for a given ply. As a user layups specific portions of the given ply (e.g., completes step 1 of the incremental placement path 370), the AR ply layup engine 110 may update the incremental placement path 370 to account for completed portions of a present ply layup. The AR headset 104 may, in effect, remove the completed portions of the incremental placement path 370 as the physical layup portions of the given ply are completed.

Ply placement positions, ply interest zones, and incremental placement paths are but three (3) examples of ply placement data that the AR ply layup engine 110 may access (e.g., generate or obtain) and the AR headset 104 may overlay in an AR view 240.

As yet another example, the AR ply layup engine 110 may access a layup simulation of applying a given ply on the composite part layup tool 210. The layup simulation may, for example, identify surface complexities that impact an effectiveness of the ply layup for the given ply (e.g., at ply interest zones along a surface of the given ply or composite part layup tool 210). The layup simulation may be, for example, produced by a CAD tool, from which the AR ply layup engine 110 may access the layup simulation.

To overlay the layup simulation in the AR view 240, the AR ply layup engine 110 may include layup simulation data as part of the ply placement data 230. In some implementations, the AR headset 104 may overlay the layup simulation over the actual surface of the composite part layup tool 210, which may provide a user a digital and simulated view of how a given ply layup can occur over the surface of the composite part layup tool 210 (or other plies already applied unto a composite laminate). As such, the AR headset 104 may drive the AR view 240 to overlay the layup simulation over an applicable portion of the composite part layup tool 210 physically visible through AR headset 104.

As other examples of ply placement data, the AR ply layup engine 110 may provide various forms of analysis data for the AR headset 104 to overlay in the AR view 240. Example analyses include structural analysis data that my indicate areas of stress or computational fluid dynamics (CFD) data, and the like. Such analysis data may, for example, by useful for a user to visualize in real-time during ply layup or with respect to an overlaid layup simulation. This may be particularly relevant as the AR headset 104 may project the analysis data specifically relevant to (e.g., overlaid upon) physical components actually visible through the AR headset 104 (e.g., the physical surfaces of the composite part layup tool 210 or other already-placed plies).

Additional examples of real-time analysis data are described next with respect to FIG. 4

Figure 4:
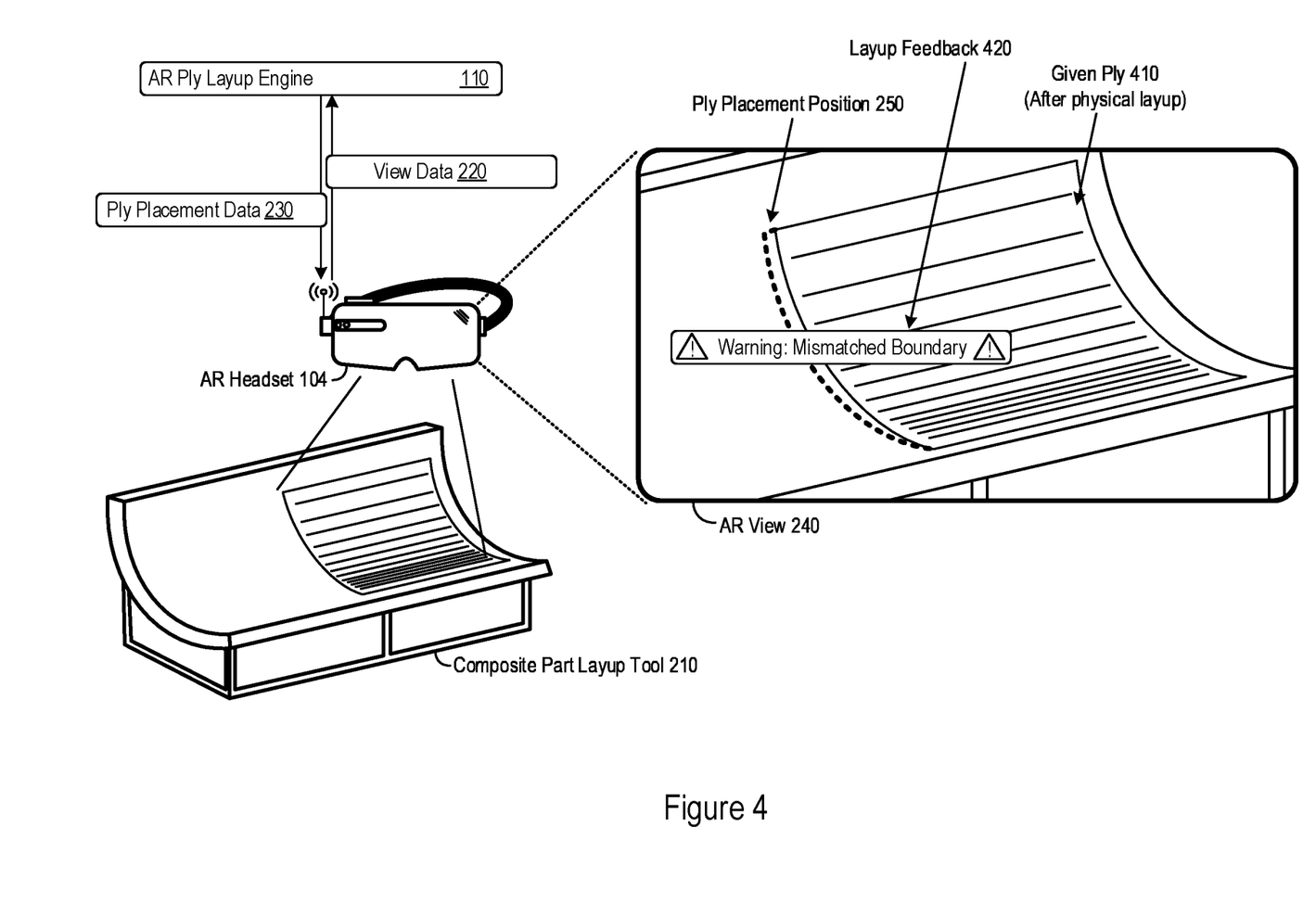
FIG. 4 shows an example of real-time analysis that the AR ply layup engine and AR headset may provide after physical layup of a given ply.

FIG. 4 shows an example of real-time analysis that the AR ply layup engine 110 and AR headset 104 may provide after physical layup of a given ply. In FIG. 4, a given ply 410 is visible through the AR headset 104 after physical layup of the given ply, e.g., as shown through the AR view 240. View data 220 of the given ply 410 may be transmitted to the AR ply layup engine 110 by the AR headset 104, from which the AR ply layup engine 110 may respond with analysis data. In other examples, the AR headset 104 captures a still image that includes the given ply 410 after physical layup for the AR ply layup engine 110 to analyze.

The AR ply layup engine 110 may generate, as analysis data, feedback for the physical layup of the given ply 410. Analysis performed or obtained by the AR ply layup engine 110 may include layup boundary or edge positioning comparisons between the actual physical layup of the given ply 410 and CAD generated simulations or ply placement positions. As another example analysis, the AR ply layup engine 110 may analyze fiber textures, orientations, or paths of the given ply after physical layup to determine layup efficacy (e.g., via comparison to CAD simulated ply layups for the given ply 410). Such analysis may include whether the physical fiber orientations are within an acceptable tolerance from a target orientation requirement (e.g., as determined via simulation, as set by CAD tools, or with respect a user-specified goal).

In the specific example shown in FIG. 4, the AR ply layup engine 110 analyzes a captured image of the given ply 410 after physical layup to provide layup feedback 420. The AR ply layup engine 110 may include the layup feedback 420 as part of the ply placement data 230, which the AR headset 104 may overlay into the AR view 240. As seen in FIG. 4, the layup feedback 420 may take the form of a warning message, e.g., that indicates an edge (or multiple edges) of the given ply 410 after layup are at least a threshold distance from the ply placement position 250 specified for the given ply 410. Similar forms of layup feedback may be provided by the AR ply layup engine 110 for disoriented fibers or other determined issues.

As another example of analysis features, the AR ply layup engine 110 and AR headset 104 may support foreign object detection for ply layups. For example, after physical layup of a given ply, the AR ply layup engine 110 may parse view data 220 provided by the AR headset 104 to analyze whether any unexpected objects are located on the composite part layup tool 210 or plies placed for the composite laminate. Such foreign object detection analysis may, for example, include comparing simulation data or expected material or laminate textures to identify inconsistencies. Example foreign objects may include any dropped items or debris inadvertently placed on the composite laminate, which the AR ply layup engine 110 may detect through such analysis. As the AR headset 104 provides a convenient mechanism to scan portions of the composite laminate (e.g., including crevices or portions blocked at different lines of sight), the AR ply layup engine 110 may detect foreign objects that may otherwise be missed by static camera systems or user error.

As yet another example analysis feature, the AR ply layup engine 110 and AR headset 104 may support generation of quality reports for ply layups. Before, during, or after physical layup of plies in construction of a composite laminate, the AR ply layup engine 110 may parse view data 220 provided by the AR headset 104 to capture relevant analysis data to include in a quality report. Such analysis data may include any combination of the various analyses discussed herein, such as ply edge verifications, foreign object detections, captured images of specific ply layups, inconsistency detections, or more. The AR ply layup engine 110 may aggregate relevant analysis data during ply layup and, in some implementations, automatically compile the quality report upon completion of the composite material.

While FIG. 4 provides examples of real-time analysis provided by the AR ply layup engine 110 and AR headset 104 after physical layup of a given ply, any of the analysis features may be provided, in a consistent manner, before or during physical layup of the given ply as well. The AR ply layup engine 110 and AR headset 104 may support provision of ply layup analysis data in real-time. In that regard, the AR ply layup engine 110 may continually analyze view data 220 or captured images provided by the AR headset 104 to obtain and provide any of the various forms of analysis data described herein as ply placement data 230. In doing so, the AR ply layup engine 110 may offer continuous or real-time feedback to a user as the physical layup for the given ply 410 occurs or completes, especially as a user views the physical surface of the given ply 410 upon application. As such, the AR-based ply layup features described herein may increase the efficiency and effectiveness of ply layups.

In any of the ways described herein, the AR ply layup engine 110 and AR headset 104 may provide and visualize ply placement data 230 in an AR view 240 to support AR-based ply layups. As yet another potential benefit of AR-based ply layups, many composite part layup tools have complex structures and facades specific to the manufacture of particularized composite parts or plies. Such composite part layup tools may include deep crevices or block portions out of various lines of sight when viewing the composite layup engine. Such regions may be inaccessible by laser-guided or static camera systems. However, with AR-based ply layups, a user may view such inaccessible regions by adjusting their physical position, all the while the AR headset 104 may overlay applicable ply placement data for such regions provided by the AR ply layup engine 110.

Figure 5:
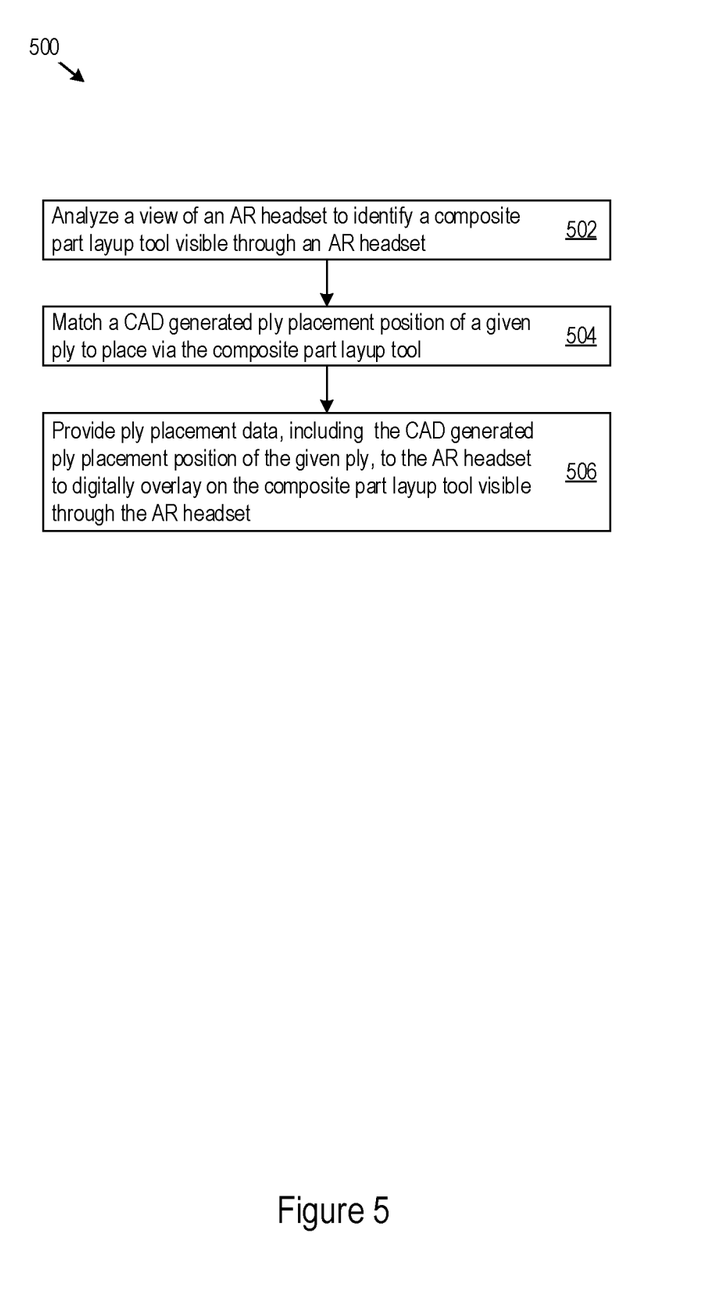
FIG. 5 shows an example of logic that a system may implement to support AR-based ply layups on a composite part layup tool.

FIG. 5 shows an example of logic 500 that a system may implement to support AR-based ply layups on a composite part layup tool. In some examples, the computing system 102 implements the logic 500 as hardware, executable instructions stored on a machine-readable medium, or as a combination of both. The computing system 102 may implement the logic 500 as the AR ply layup engine 110, through which the computing system 102 may perform or execute the logic 500 as a method for generate and provide ply placement data to an AR headset for AR-based ply layups. The following description of the logic 500 is provided using the AR ply layup engine 110 as an example. However, various other implementation options by the computing system 100 are possible.

In implementing the logic 500, the AR ply layup engine 110 may analyze a view of an AR headset to identify a composite part layup tool visible through an AR headset (502) and match a CAD generated ply placement position of a given ply to layup via the composite part layup tool (504). The ply placement position may form part of the ply placement data that the AR ply layup engine 110 may obtain and provide to the AR headset. As such, the AR ply layup engine 110 may provide the CAD generated ply placement position of the given ply to the AR headset as ply placement data to digitally overlay on the composite part layup tool visible through the AR headset (506).

Figure 6:
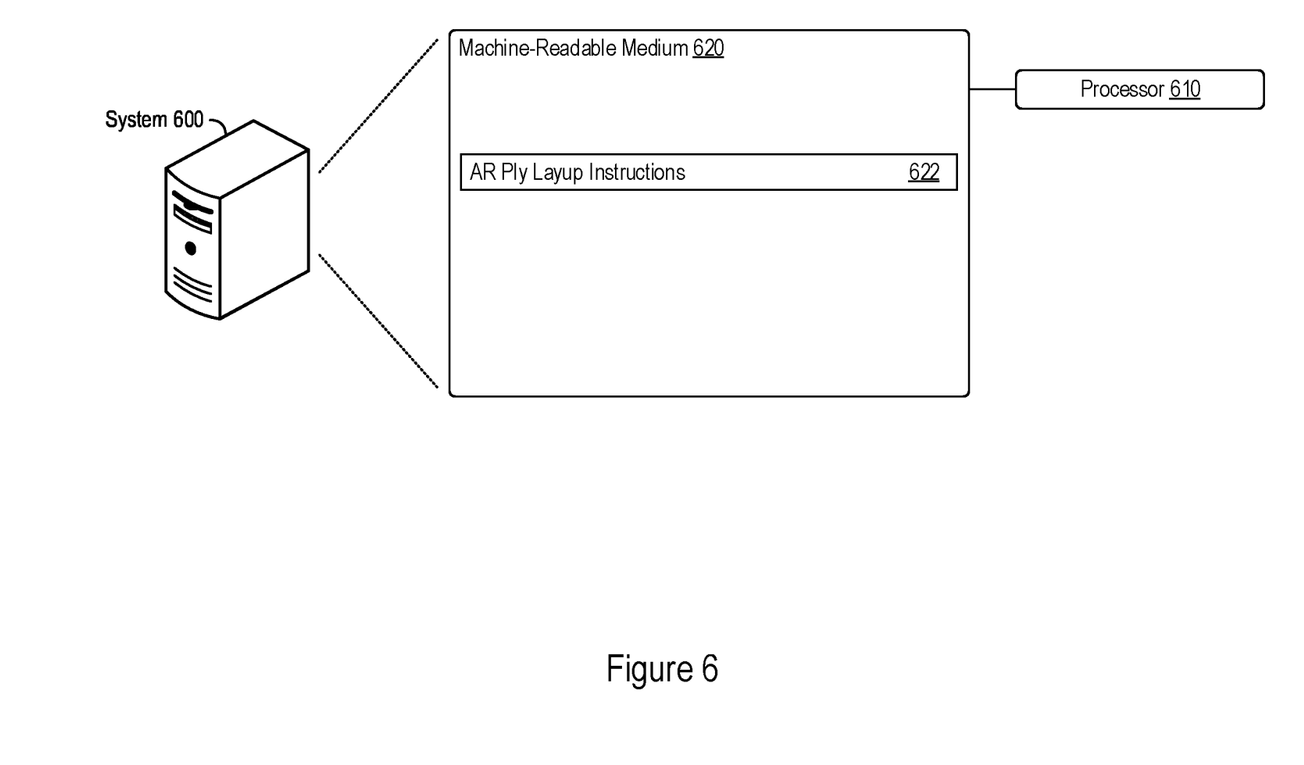
FIG. 6 shows an example of a system that supports AR-based ply layups on a composite part layup tool.

FIG. 6 shows an example of a system 600 that supports AR-based ply layups on a composite part layup tool. The system 600 may include a processor 610, which may take the form of a single or multiple processors. The processor(s) 610 may include a central processing unit (CPU), microprocessor, or any hardware device suitable for executing instructions stored on a machine-readable medium. The system 600 may include a machine-readable medium 620. The machine-readable medium 620 may take the form of any non-transitory electronic, magnetic, optical, or other physical storage device that stores executable instructions, such as the AR ply layup instructions 622 shown in FIG. 6. As such, the machine-readable medium 620 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The system 600 may execute instructions stored on the machine-readable medium 620 through the processor 610. Executing the instructions may cause the system 600 (or any other CAD system) to perform any of the AR-based ply layup features described herein, including according to any of the features with respect to the AR ply layup engine 110, the AR headset 104, or combinations thereof.

For instance, execution of the AR ply layup instructions 622 by the processor 610 may cause the system 600 to analyze a view of an AR headset to identify a composite part layup tool visible through an AR headset; match a CAD generated ply placement position of a given ply to layup via the composite part layup tool; determine an incremental placement path for the given ply; and provide the CAD generated ply placement position and the incremental placement path for the given ply to the AR headset as ply placement data to digitally overlay on the composite part layup tool visible through the AR headset. Execution of the ply layup instructions 622 may cause the system 600 to perform any number additional or alternative features as described herein, by which the system 600 may support AR-based ply layups on a composite part layup tool.

The systems, methods, devices, and logic described above, including the AR ply layup engine 110 and AR headset 104, may be implemented in many different ways in many different combinations of hardware, logic, circuitry, and executable instructions stored on a machine-readable medium. For example, the AR ply layup engine 110 or the AR headset 104 may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the AR ply layup engine 110, the AR headset 104, or combinations thereof.

The processing capability of the systems, devices, and engines described herein, including the AR ply layup engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A system comprising:
an augmented reality (AR) headset configured to drive an AR view that digitally visualizes ply placement data on a composite part layup tool physically visible through the AR headset; and
an AR ply layup engine configured to:
analyze a view of the AR headset to identify the composite part layup tool;
match a computer-aided design (CAD) generated ply placement position of a given ply to layup via the composite part layup tool;
determine an incremental placement path for the given ply, wherein the incremental placement path specifies a layup sequence for different portions of the given ply via the composite part layup tool; and provide the CAD generated ply placement position of the given ply to the AR headset and the incremental placement path for the given ply as the ply placement data to digitally overlay on a view visible through the AR headset.

2. The system of claim 1, wherein the AR ply layup engine is further configured to:
access a layup simulation of applying the given ply via the composite part layup tool,
  wherein the layup simulation comprises a simulated view of an application of a ply layup for the given ply via the composite part layup tool and wherein the layup simulation identifies surface complexities that impact an effectiveness of the ply layup for the given ply; and
provide the layup simulation tool to the AR headset further as the ply placement data to digitally overlay on the view visible through the AR headset; and
wherein the AR headset is configured to drive the AR view to overlay the layup simulation over an applicable portion of the view visible through the AR headset.

3. The system of claim 1, wherein the AR ply layup engine is configured to analyze the view of the AR headset to identify the composite part layup tool by determining an orientation of the view with respect to the composite part layup tool, identifying other plies already placed using the composite part layup tool, or a combination of both.

4. The system of claim 3, wherein the AR ply layup engine is configured to continually analyze the view of the AR headset to identify the composite part layup tool as a user of the AR headset physically moves.

5. The system of claim 1, wherein the AR headset is further configured to capture an image of the composite part layup tool after physical layup of the given ply; and
  wherein the AR ply layup engine is further configured to:
    analyze the captured image to compare the physical layup of the given ply with a CAD simulated layup of the given ply; and
    provide real-time feedback resulting for the analysis to the AR headset for presentation in the AR view.

6. The system of claim 1, wherein the AR ply layup engine is further configured to identify a ply interest zone for the given ply, wherein the ply interest zone identifies a selected portion of the given ply that exhibits a layup characteristic different than other portions of the given ply; and
  wherein the AR ply layup engine is configured to provide the ply interest zone further as part of the ply placement data to digitally overlay on the view visible through the AR headset.

7. A method comprising:
by a computing system:
  analyzing a view of an augmented reality (AR) headset to identify a composite part layup tool visible through an AR headset;
  matching a computer-aided design (CAD) generated ply placement position of a given ply to layup via the composite part layup tool;
  accessing a layup simulation of applying the given ply via the composite part layup tool, wherein the layup simulation comprises a simulated view of an application of a ply layup for the given ply via the composite part layup tool and wherein the layup simulation identifies surface complexities that impact an effectiveness of the ply layup for the given ply; and
  providing the CAD generated ply placement position of the given ply and the layup simulation to the AR headset as ply placement data to digitally overlay on a view visible through the AR headset.

8. The method of claim 7, further comprising:
determining an incremental placement path for the given ply, wherein the incremental placement path specifies a layup sequence for different portions of the given ply via the composite part layup tool; and
providing the incremental placement path for the given ply to the AR headset further as the ply placement data to digitally overlay on the view visible through the AR headset.

9. The method of claim 7, wherein analyzing the view of the AR headset to identify the composite part layup tool comprises determining an orientation of the view with respect to the composite part layup tool, identifying other plies already placed using the composite part layup tool, or a combination of both.

10. The method of claim 9, comprising continually analyzing the view of the AR headset to identify the composite part layup tool as a user of the AR headset moves.

11. The method of claim 7, further comprising
analyzing an image of the composite part layup tool captured after physical layup of the given ply has completed to compare the physical layup of the given ply with a CAD simulated layup of the given ply; and
providing real-time feedback resulting for the analysis to the AR headset for presentation in an AR view.

12. The method of claim 7, further comprising:
identifying a ply interest zone for the given ply, wherein the ply interest zone identifies a selected portion of the given ply that exhibits a layup characteristic different than other portions of the given ply; and
providing the ply interest zone further as part of the ply placement data to digitally overlay on the view visible through the AR headset.

13. A non-transitory machine-readable medium comprising instructions that, when executed by a processor, cause a system to:
analyze a view of an augmented reality (AR) headset to identify a composite part layup tool visible through an AR headset;
match a computer-aided design (CAD) generated ply placement position of a given ply to layup via the composite part layup tool;
determine an incremental placement path for the given ply, wherein the incremental placement path specifies a layup sequence for different portions of the given ply via the composite part layup tool; and
provide the CAD generated ply placement position and the incremental placement path for the given ply to the AR headset as ply placement data to digitally overlay on a view visible through the AR headset.

14. The non-transitory machine-readable medium of claim 13, further comprising instructions that, when executed by the processor, cause the system to:
access a layup simulation of applying the given ply on the composite part layup tool, wherein the layup simulation comprises a simulated view of an application of a ply layup for the given ply via the composite part layup tool and wherein the layup simulation identifies surface complexities that impact an effectiveness of the ply layup for the given ply; and
provide the layup simulation to the AR headset further as part of the ply placement data to digitally overlay on the view visible through the AR headset.

15. The non-transitory machine-readable medium of claim 13, further comprising instructions that, when executed by the processor, cause the system to:
- analyze an image of the composite part layup tool captured after physical layup of the given ply has completed to compare the physical layup of the given ply with a CAD simulated layup of the given ply; and
- provide real-time feedback resulting for the analysis to the AR headset for presentation in an AR view.

16. The non-transitory machine-readable medium of claim 13, wherein the instructions, when executed, cause the system to analyze the view of the AR headset to identify the composite part layup tool by determining an orientation of the view with respect to the composite part layup tool, identifying other plies already placed using the composite part layup tool, or a combination of both.

17. The non-transitory machine-readable medium of claim 16, wherein the instructions, when executed, cause the system to continually analyze the view of the AR headset to identify the composite part layup tool as a user of the AR headset physically moves.

18. The non-transitory machine-readable medium of claim 13, further comprising instructions that, when executed by the processor, cause the system to:
- identify a ply interest zone for the given ply, wherein the ply interest zone identifies a selected portion of the given ply that exhibits a layup characteristic different than other portions of the given ply; and
- provide the ply interest zone further as part of the ply placement data to digitally overlay on the view visible through the AR headset.

\* \* \* \* \*